Oct. 11, 1949.

R. BRUNKEN ET AL
ELECTRIC CONTROL MECHANISM FOR
AUTOMATIC TRANSMISSIONS 2,484,011

Filed April 2, 1945

INVENTOR.
RENKE BRUNKEN
RAYMOND HAAG
BY
Richey & Watts
ATTORNEYS

Oct. 11, 1949.       R. BRUNKEN ET AL       2,484,011
           ELECTRIC CONTROL MECHANISM FOR
                AUTOMATIC TRANSMISSIONS
Filed April 2, 1945                      8 Sheets-Sheet 2

INVENTORS
RENKE BRUNKEN
BY RAYMOND HAAG

ATTORNEYS

INVENTORS
RENKE BRUNKEN
RAYMOND HAAG
BY
ATTORNEYS

Patented Oct. 11, 1949

2,484,011

UNITED STATES PATENT OFFICE 2,484,011

ELECTRIC CONTROL MECHANISM FOR AUTOMATIC TRANSMISSIONS

Renke Brunken and Raymond Haag, Cleveland, Ohio

Application April 2, 1945, Serial No. 586,146

18 Claims. (Cl. 74—731)

This invention relates broadly to hydraulic transmissions of the type that embodies auxiliary gearing and more specifically to improvements in the gear shift control mechanism therefor.

In my copending application, Serial No. 436,443, filed March 27, 1942, now Patent No. 2,373,453, dated April 10, 1945, entitled "Automatic gear shifting mechanism for transmissions" a control mechanism is disclosed that comprises a plurality of differential gear units coupled respectively with the engine, turbine and propeller shaft in a motor vehicle, which are coupled in turn with governors and electric switches organized to effect the operation of the change speed gear actuating mechanism in response to the variable speed, torque and load conditions imposed upon the engine.

The present invention comprehends a control mechanism that is an improvement of the form disclosed in said copending application and is directed primarily to instrumentalities to eliminate the hunting of the gear shift control set when certain speed and torque ratios are attained during the operation of the vehicle.

More particularly the invention contemplates an electrical holding circuit having mechanism therein to prevent the gear shift element from moving back and forth or fluttering when the electric instruments for the control thereof are excited under certain torque and speed conditions.

Other objects and advantages more or less ancillary to the foregoing and the manner in which all the various objects are realized will appear in the following description, which considered in connection with the accompanying drawings, sets forth the preferred embodiment of the invention.

Referring to the drawings.

Figure 1:
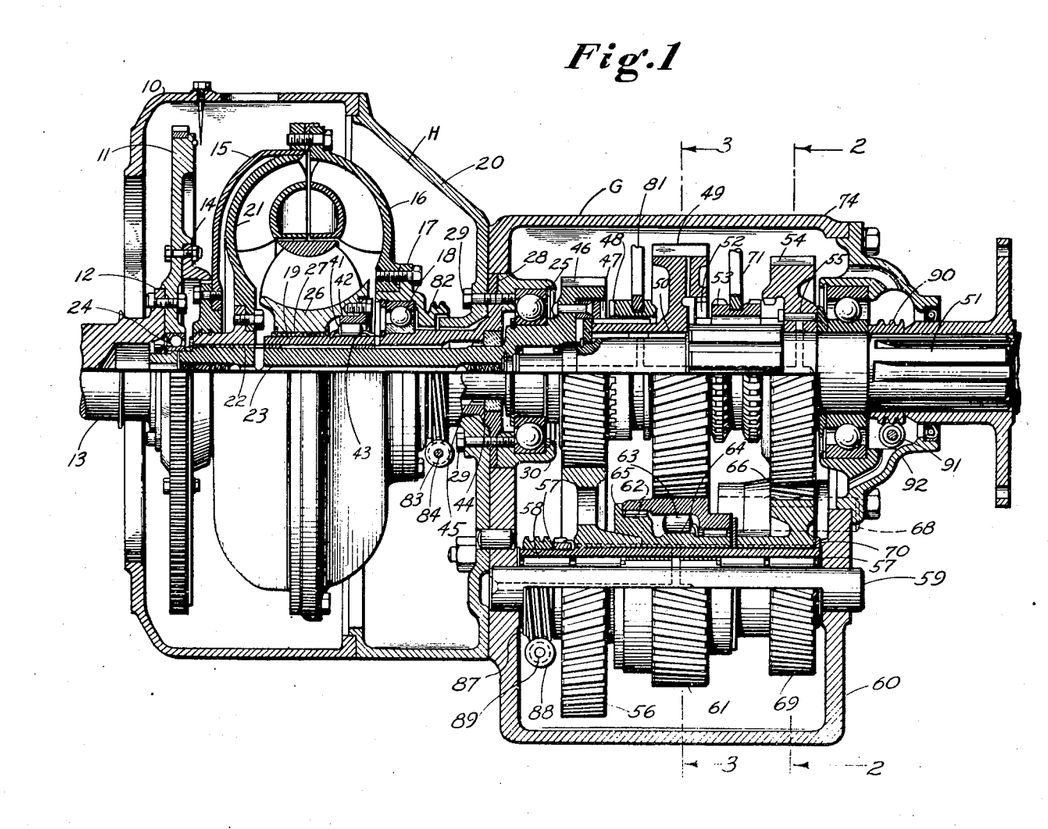
Fig. 1 is a horizontal section through a hydraulic drive unit and the change speed gear set therefor.

Referring first to Fig. 1, the transmission comprises generally a hydraulic unit H and a gear train G. The hydraulic unit embodies a housing 10 formed for the reception of a fly wheel 11 bolted to a companion flange 12 on the end of the engine crankshaft 13. The fly wheel 11 is formed with a bearing seat for the reception of a flange 14 bolted to a driving member 15 which is bolted in turn to the torque converter pump 16. The outer end of the pump 16 is supported upon a bearing cage 17 having an anti-friction bearing 18 therein which is mounted upon a reaction member sleeve 19 affixed to the torque converter housing 20.

The turbine 21 is formed with a hub 22 broached for engagement with a shaft 23 mounted on ball bearings 24 supported in the fly wheel 11 and an anti-friction bearing 25 carried by the torque converter housing 20.

The reaction member 26 of the torque converter is mounted for rotative movement upon a wear bushing 27 pressed on the sleeve 19, the major portion of the sleeve being disposed in spaced relation with the shaft 23. The outer end of the sleeve is formed with a flange 28 which is drilled for the reception of the cap screws 29 for the support of the bearing retainer 30.

A free wheeling mechanism 41 is associated with the reaction member 26, the outer race 42 thereof being bolted to the face of the reaction member while the inner race or cam 43 therefor is formed in the body of the sleeve 19. The flange 28 is counterbored for the reception of a bearing 44 for the support of a journal 45 machined in the shaft 23. The enlarged end portion of the shaft 23 is machined to form a spur gear 46 having an internal dog clutch 47 therein mounted for engagement with a companion member 48 supported for reciprocative movement upon the splined hub of a gear 49 supported on needle bearings 50 on the propeller shaft 51. The gear 49 is formed with internal teeth 52 in the web thereof adapted for engagement with a clutch 53 mounted upon a splined portion of the shaft 51. The clutch 53 is further engageable with the toothed portion of a third spur gear 54 mounted on needle bearings 55 on the shaft 51.

The gear 46 is meshed with a gear 56 broached for engagement with a splined sleeve 57 mounted on needle bearings 58 upon a bar 59 secured in the gear case 60. The gear 49 is meshed with a gear 61 bored for the reception of a needle bearing 62 and a free wheeling mechanism 63, the cam element 64 thereof being formed in the circumferential face of a hub member 65 which is engaged with the splined sleeve 57. The gear 54 is meshed with an idler gear 66 supported on anti-friction bearings 67 mounted on a bar 68 secured in the gear case 60. The idler gear in turn is meshed with a reverse gear 69 affixed to the sleeve 57 and restrained against axial movement by a snap ring 70.

Figure 2:
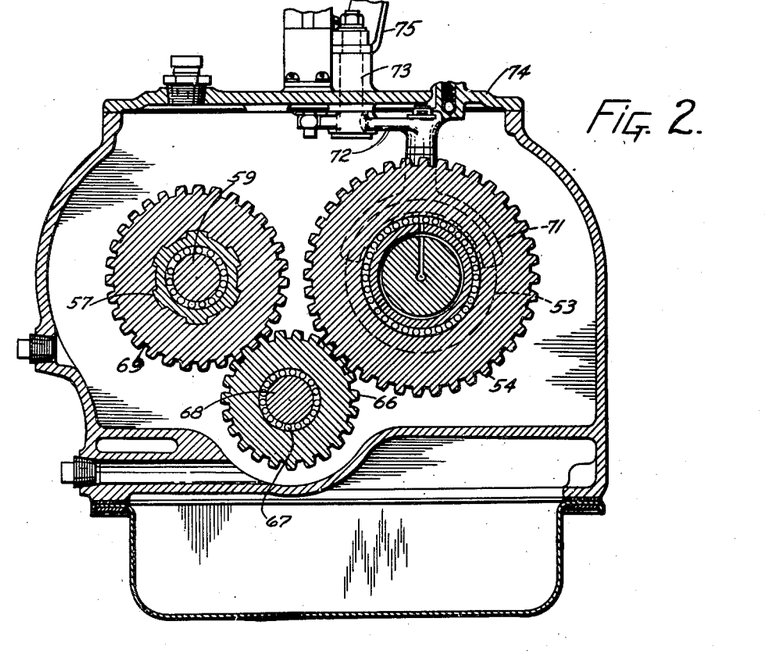
Fig. 2 is a transverse sectional view taken on the line 2—2 of Fig. 1.
Figure 3:
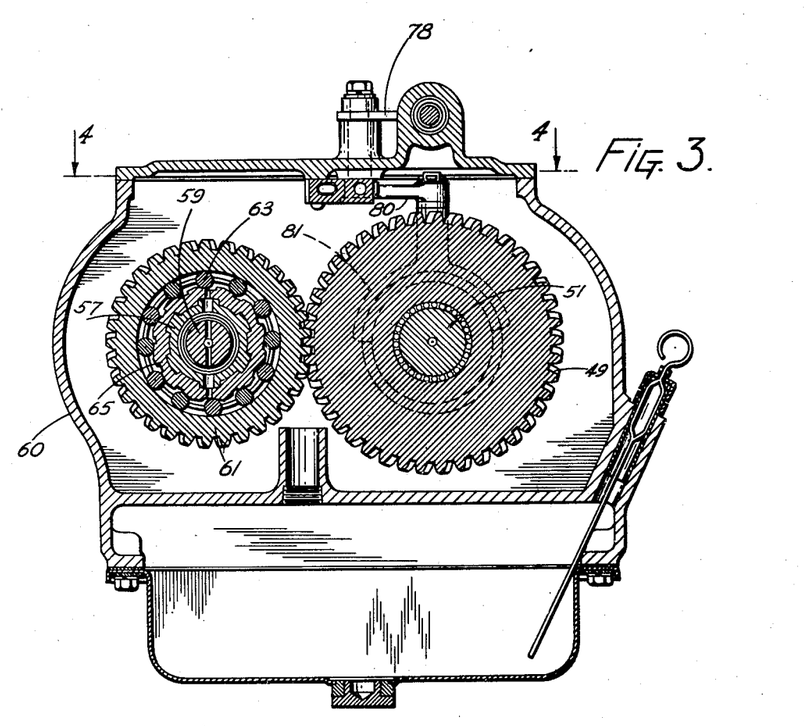
Fig. 3 is a transverse sectional view taken on the line 3—3 of Fig. 1.
Figure 4:
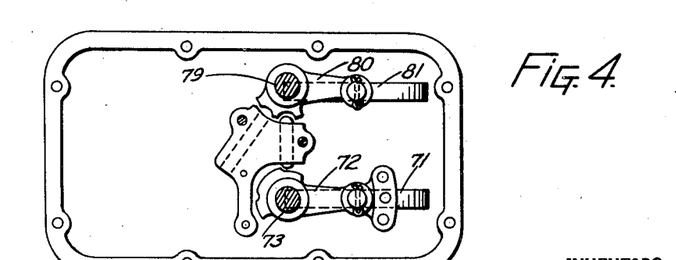
Fig. 4 is a transverse section taken on the line 4—4 of Fig. 3.

The clutch 53 is formed with an annular groove for the reception of a yoke 71 (Fig. 2) mounted on an arm 72 keyed to a pin 73 mounted for pivotal movement in the gear case cover plate 74. A manually operable gear shift lever 75 is also keyed to the portion of the pin 73 which protrudes beyond the outer face of the cover plate 74. Actuation of the lever 75 to the limit of its clockwise movement or the position F (Fig. 6) effects the engagement of the clutch 53 with the gear 49 (Fig. 1) and thus couples the propeller shaft with the engine through the torque converter pump 16 either directly or through the reduction gear train. Actuation of the lever 75 to the limit of its counterclockwise movement or the position R effects the engagement of the clutch 53 with the gear 54 and thus couples the propeller shaft for reverse drive through the idler 66, the gear 69, the sleeve 57 and the source of power as in the former case. Adjustment of the lever 75 to the medial or neutral position N as shown in Fig. 6 will bring the clutch 53 intermediate the forward and reverse gears 49 and 54, as shown in Fig. 1, and thus accommodate operation of the engine while the vehicle is at rest.

Figure 6:
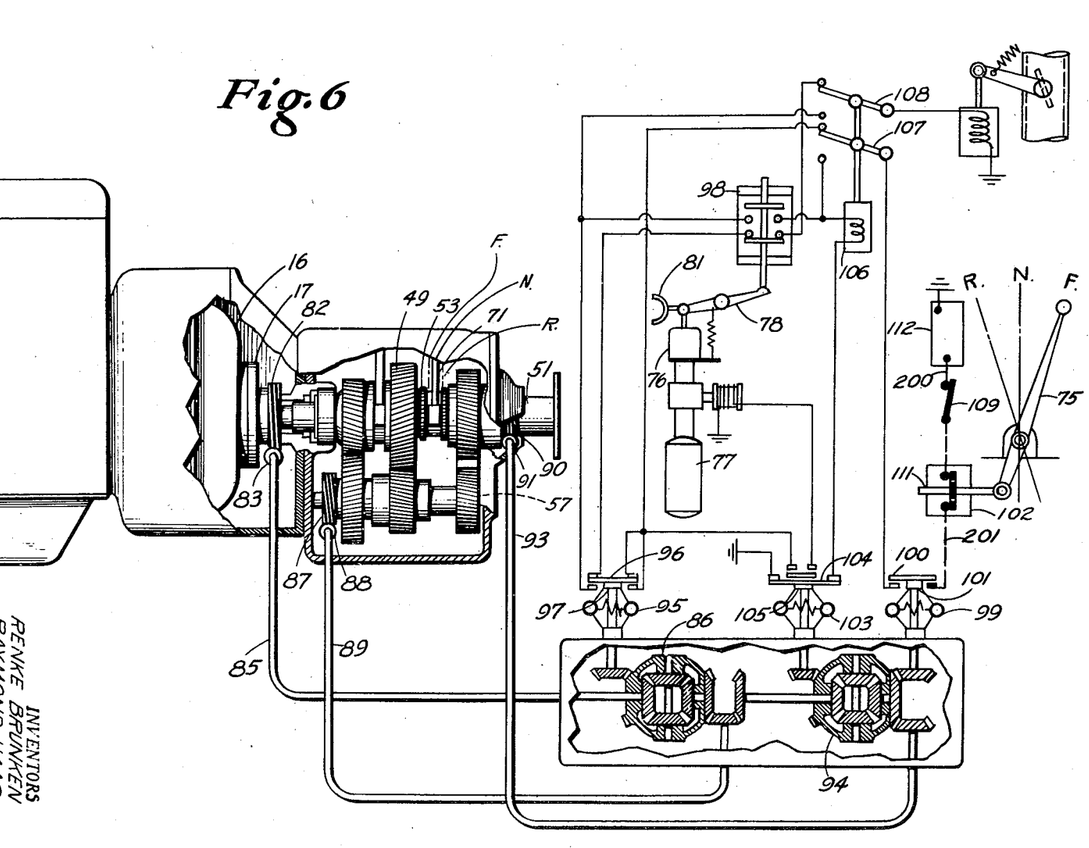
Fig. 6 is a diagrammatic view of a fragmentary portion of an engine, the transmission shown in Fig. 1, the differential gear unit (illustrated in section) and the wiring diagram for the instruments associated with the change speed gear actuating mechanism.

The clutch 48, which is provided to effect high and low speed drive, is actuated by a piston mounted in a cylinder 76 connected with source of fluid under pressure, such for example as the compressed air reservoir 77 illustrated diagrammatically in Fig. 6. The piston in the cylinder 76 is connected with a lever 78 keyed to a pin 79 having an arm 80 affixed thereto upon which there is mounted a yoke 81 engaged in a groove in the clutch member 48.

When the piston is retracted as shown in Fig. 6, the clutch 48 is disengaged from the gear 46 (Fig. 1) and power is transmitted through the gear train. When, however, the clutch is engaged with the gear 46 power is transmitted through the splined hub of the gear 49 and through the clutch 53 to the propeller shaft 51, the gear 61 at this time overrunning the cam 65 through the free wheel unit 63.

Speed changes from low to high and from high to low are effected by the automatic operation of the fluid actuating mechanism for the clutch 48, the control mechanism therefor being regulated by the speed difference between the engine and turbine and/or the turbine and propeller shaft.

As illustrated in Fig. 6, the mechanism for effectuating the automatic gear shift operation embodies, generally, an organization of differential gear units driven by the engine, turbine and propeller shaft and coupled in turn with electric responsive devices for controlling the operation of the valve to the fluid actuating mechanism. In detail the bearing cage 17 for the pump 16 is formed with a spiral gear 82 engaged with a driven spiral gear 83 mounted on a shaft 84 coupled with a flexible drive shaft 85 which is connected in turn to one side of a differential gear unit 86. The inner end of the sleeve 57 in the countershaft gear assembly is provided with a spiral gear 87 meshed with a spiral gear 88 coupled with a flexible shaft 89 connected through bevel gearing with the opposite side of the differential gear unit 86 and through bevel gearing with one side of a differential gear unit 94. The propeller shaft 51 is provided with a spiral gear 90 meshed with a driven gear 91 mounted on a shaft 92 having a flexible shaft 93 coupled therewith which is connected with the opposite side of the second differential gear unit 94. The housing or driven element of the differential gear unit 86 is intergeared with a governor 95 having a switch plate 96 mounted thereon adapted for engagement with contacts in a switch unit 97 electrically connected with a second switch unit 98 controlled by the fluid actuated piston in the cylinder 76. The flexible shaft 93 is also coupled through bevel gearing with a governor 99 having a switch plate 100 mounted thereon adapted for engagement with contacts in a switch 101 electrically connected with a switch 102 controlled by the gear shift lever 75. The differential gear unit 94 is further intergeared with a governor 103 having a switch plate 104 mounted thereon engageable with contacts in a switch 105 electrically connected with the switch 97 and a solenoid 106 controlling a pair of switches 107 and 108.

In operation, the vehicle may be put into motion by closing the ignition switch 109, starting the engine, adjusting the gear shift lever 75 to the forward drive position (F), thus engaging the clutch 53 with the gear 49 then accelerating the engine to effect transmission of power through the torque converter and gear train coupled with the propeller shaft. Adjustment of the lever 75 will bring the arm thereon into abutting engagement with the spring pressed stem 111 of the switch 102, and permit the current from the battery 112 to flow through the lines 200 and 201 to the switch 101.

Figure 7:
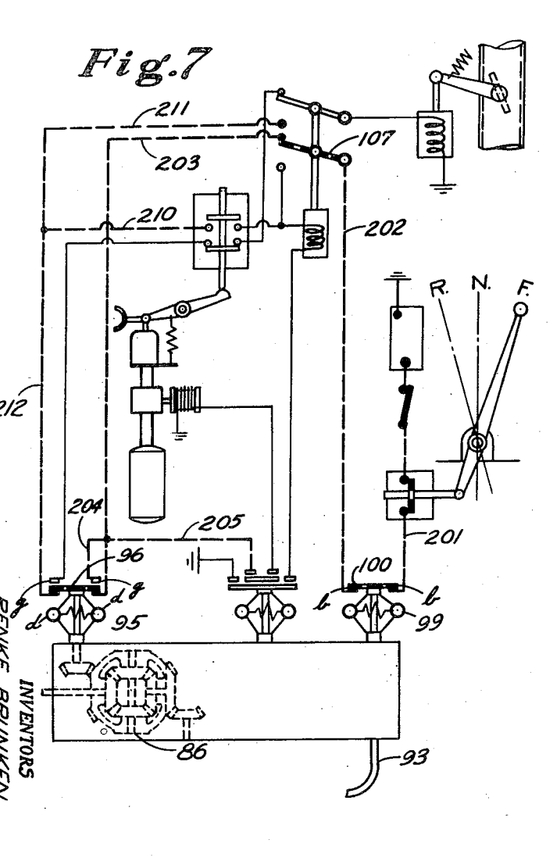
Figs. 7 to 14, inclusive, are wiring diagrams illustrating the connections between the various instruments in the gear shift control mechanism, the heavy lines in the figures indicating the flow of current through the circuit and the progressive actuation of the parts affected thereby.

Referring now to Fig. 7, as the vehicle attains speed the flexible cable 93 from the propeller shaft will cause the rotation of the governor 99, actuation of the plate 100 into circuit closing position through the contacts b—b, and energization of the line 202, the switch 107, lines 203, 204 and 205. During this period of operation the speed difference between the engine and turbine will rotate the gear cage of the differential gear unit 86 and the governor 95 at a rate of speed which will retract the plate 96 from the contacts g—g and close contacts d—d, thereby energizing the lines 212, 211 and 210.

Figure 8:
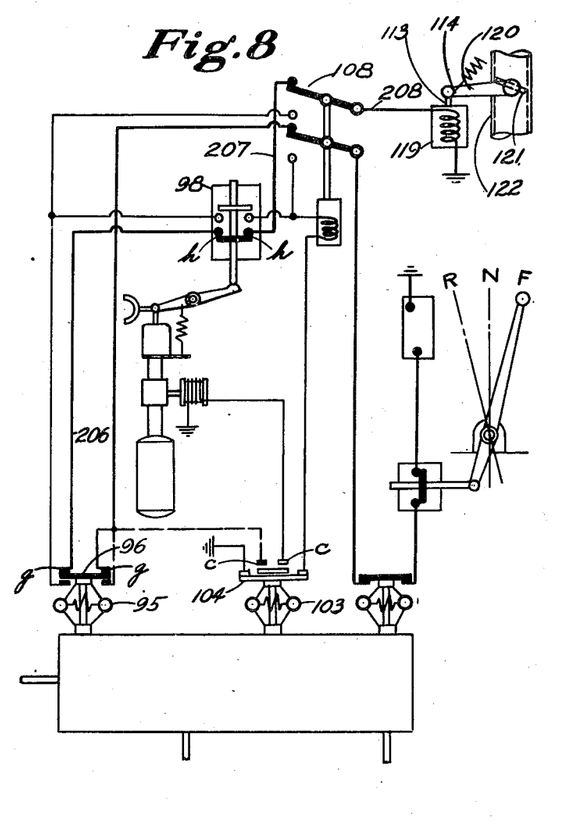

As shown in Fig. 8, when the speed difference between the engine and turbine descends to a predetermined rate due to decreased vehicular loads, or changes in the throttle setting, the plate 96 under the influence of the decelerated movement of the differential 86 and governor 95 will engage the contacts g—g and thus cause the electric current to flow through the line 206, the contact points h—h in the switch 98, the line 207, the switch 108 and the line 208 to a solenoid 119, thus effecting the energization thereof. The plunger 113 of the solenoid is connected to an arm 120 for the control of a butterfly valve 121 mounted in the carburetor riser 122. The valve 121 is normally held in its open position by a spring 114 urging the plunger outwardly. When the solenoid 119, which is of the pull type, is energized, the butterfly valve will be moved towards its closed position and thus restrict the fuel supply to the engine and cause a drop in the R. P. M. thereof.

Figure 9:
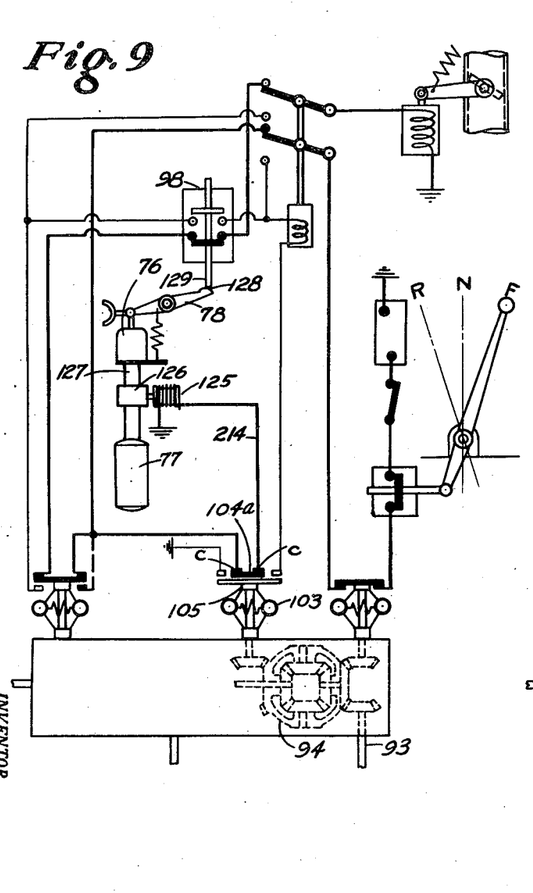

Referring now to Fig. 9, when the speed of the engine descends the speed of the turbine will likewise fall but the vehicle speed, during this period of speed transition, will remain substantially constant due to the inertia of the vehicle and the action of the free wheeling unit 63. When, however, the propeller shaft and turbine attain the same speed the differential gear unit 94 and the governor 103 will permit the plate 104a to ascend and bridge the contacts c—c in the switch 105 and cause the current to flow through the line 214 to a solenoid 125. The latter solenoid is coupled to a spring pressed valve 126 interposed in a conduit 127 connecting the piston and cylinder 76 with the compressed air reservoir 77.

The valve 126 is not illustrated in detail in the drawings since it may be any suitable commercial valve adapted to supply the cylinder 76 with air from the compressed air supply so as to actuate the piston against the force of the spring and to disconnect the compressed air from the cylinder and provide an atmospheric exhaust from the cylinder so that the spring can retract the shifter fork. Valves capable of performing this function are numerous and are standard articles of commerce. Reference is made to Patent No. 2,322,479 of H. O. Schjolin, June 22, 1943, entitled "Torque converter—interlocking control, automatic," and particularly to Fig. 3 thereof for a disclosure of a solenoid operated valve of a type which may be employed in the combination disclosed herein.

Energization of the solenoid 125 will open the valve 126, effect the translation of the piston and consequent engagement of the clutch 48 with the gear 46. It will be borne in mind that this operation occurs when the R. P. M. of the propeller shaft and turbine are substantially equal, hence the movement of the clutch and interengagement of the toothed parts will be effected without gear clash or undue friction.

Figure 10:
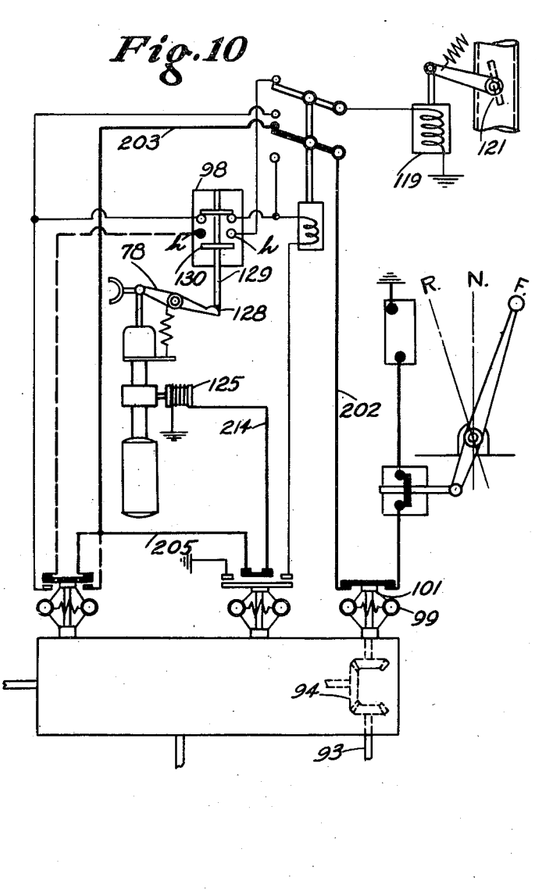

As will be seen in Fig. 10 movement of the lever 78 will retract the cam 128, formed in the end thereof into engagement with the spring pressed switch stem 129 of the switch unit 98 and thus permit retraction of the switch plate 130, interruption of the circuit between the contacts h—h and de-energization of the solenoid 119, readjustment of the butterfly valve 121 to its open position under the action of the spring pressed plunger in the solenoid 119 and restoration of the engine speed consonate the throttle setting therefor.

Should the operator reduce the speed of the vehicle preliminary to making a stop, while the instruments are so adjusted, the switch 101 will be opened under the influence of the governor 99 which is driven at propeller shaft speed through cable 93 and bevel gears driving the differential gear unit 94. This will cause the circuit to the lines 202, 203, 205 and 214 to be broken, the solenoid 125 de-energized, the piston retracted and the clutch 48 disengaged with the gear 46. The latter operation effectuates the transposition of the clutch and the transmission of power through the reduction gearing, in other words, the so called gear shift from high to low. It will be noted that the latter adjustment of the switch 101 will restore the electric circuit to the condition illustrated in Fig. 6.

Figure 11:
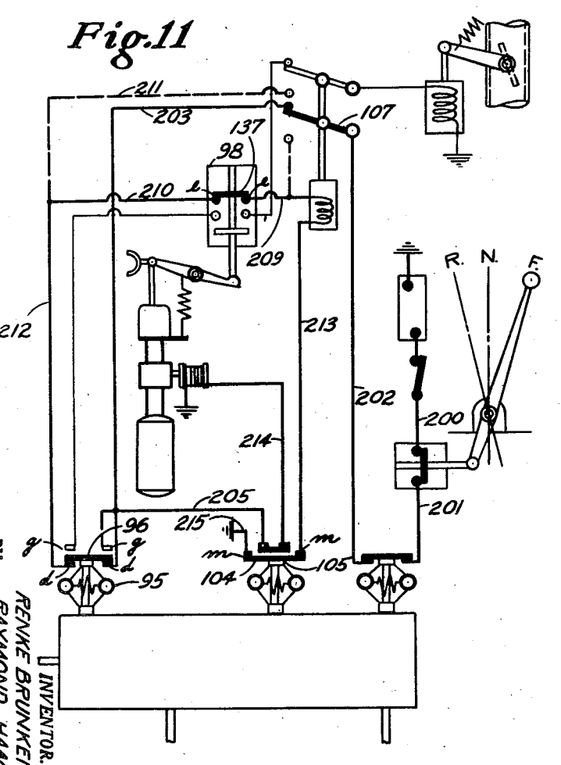

Referring to Fig. 11, when the engine is subjected to an increased load, for example a steep hill while in high gear, the speed of the turbine will be gradually decreased and the speed difference between the engine and turbine increased until the rotation of the differential gear unit 86 and governor 95 reach a predetermined maximum, whereupon the plate 96 will be retracted from the contacts g—g and effect the bridged relation thereof with the contacts d—d. Under such condition the current will flow through the lines 200, 201, 202, the switch 107, lines 203, 205, 214, 212 and 210, the contacts e—e, the plate 137 in the switch 98, the lines 209 and 213 through the contacts m—m bridged by the plate 104 and to the ground line 215 from the switch 105.

Figure 12:
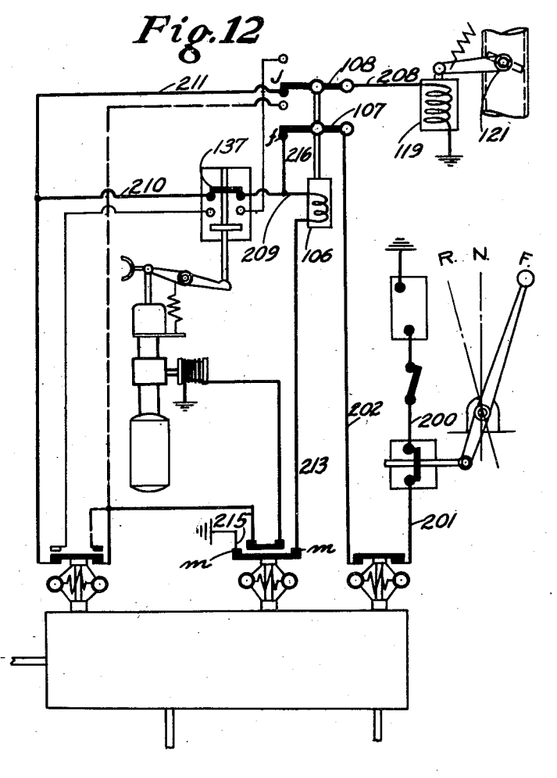

As shown in Fig. 12, when the circuit between the contacts m—m is closed as occurs while in direct drive or so called high gear the solenoid 106 will effect the actuation of the switches 107 and 108 into bridged relation with the contacts f and j, thus maintaining the energization of the solenoid 106. The current will now flow through the line 200, 201 and 202, the switch 107, the lines 216 and 209 through solenoid 106 and to the ground through the lines 213 and 215. With the switches thus arranged the current will also flow from the line 209 through the switch plate 137 to the lines 210, 211 through the switch 108 and line 208 to the solenoid 119. As the solenoid 119 is energized the plunger will be retracted and the butterfly valve 121 moved towards its closed position, thus reducing the fuel supply to the engine and reducing the speed thereof. As the engine speed falls off a torque reversal will occur and the driving force will be applied to the propeller shaft 51.

Figure 13:
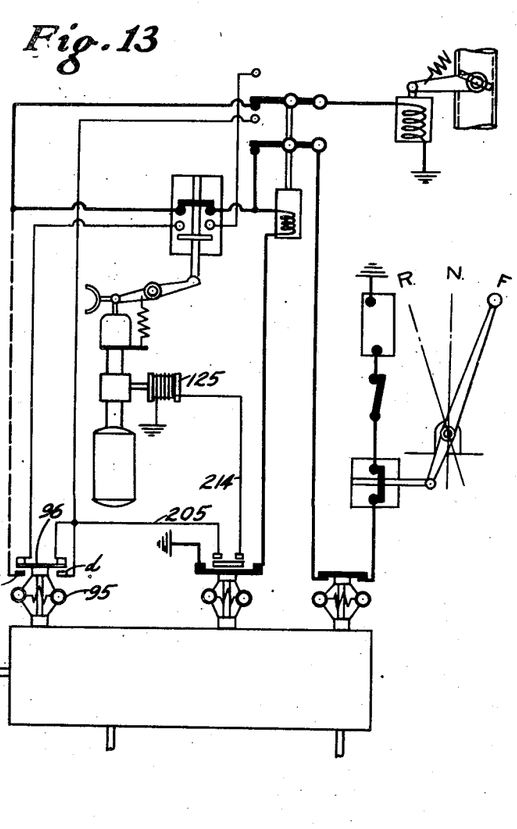

With reference to Fig. 13, when the engine speed decreases the differential speed between the engine and turbine will likewise be decreased, thus causing the deceleration of the gear unit 86 and governor 95, the consequent movement of the switch plate 96 out of engagement with the contacts d—d, and the interruption of the circuit through the lines 205 and 214 to the solenoid 125.

Figure 5:
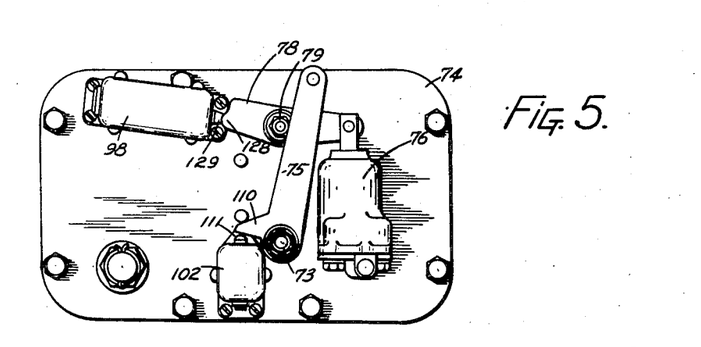
Fig. 5 is a plan view of the control mechanisms shown in Fig. 2.
Figure 14:
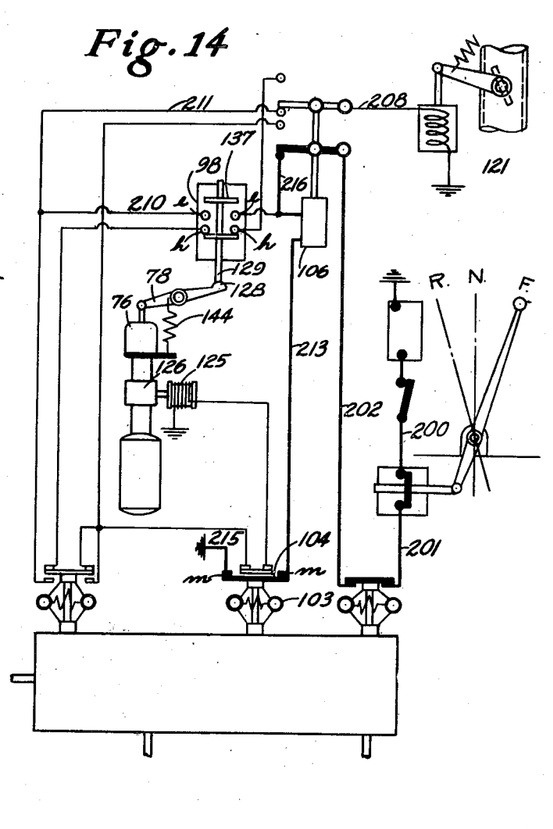

As shown in Fig. 14, when the solenoid 125 is de-energized the valve 126 will be closed under the influence of the spring associated therewith, the piston in the cylinder 76 retracted through the action of the spring 144, the lever 78 oscillated upon its fulcrum and the clutch 48 shifted out of engagement with the gear 46. Adjustment of the lever 78 will bring the peak of the cam 128 (Fig. 5) into engagement with the stem 129 of the switch 98 which in turn will lift the plate 137 from the contacts e—e, close the circuit through the contacts h—h, break the circuit through the lines 210, 211 and 208, de-energize the solenoid 119, open the butterfly valve 121 and thus increase the speed of the engine consonate with the throttle setting therefor.

It will be noted that the coil in the solenoid 106 is excited, during this period of operation, by a holding circuit carrying current from the battery through the lines 200, 201, 202, 216, 213 to the ground line 215. Obviously, this circuit must be broken before current to the solenoid 125 is restored to effect a shift into high gear. This will occur with an increase of vehicle speed and the consequent increase of speed difference between the turbine and propeller shaft. Since the driven shafts associated with the turbine and propeller shaft are intergeared in a fixed ratio during acceleration, the speed of the governor 103 is dependent only upon the speed of the vehicle, hence the switch plate 104 will be retracted from the contacts m—m when and only when the vehicle reaches a predetermined rate of speed. When the current through the line 213 is broken the circuit will be restored to the condition illustrated in Fig. 7, i. e. the preliminary setting for the shift into high, hence the holding circuit and operation of the switch 104, as defined above, will prevent the shifting of the clutch 48 and thus eliminate "hunting" of the transmission until the vehicle attains the proper rate of speed.

When the operator brings the vehicle to a full stop the mechanism will automatically shift the clutch from high to low and also effect the operation of the switch 101 restoring the circuit to the condition in Fig. 6.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

We claim:

1. In a motor vehicle embodying an engine, a torque converter having a turbine therein and a gear train associated therewith, a propeller shaft, and a clutch, mechanism for controlling the operation of said clutch, comprising a fluid operated piston connected with said clutch, a differential gear unit driven by the engine and turbine, a speed responsive electric switch actuated by the differential gear unit, a second differential gear unit driven by the propeller shaft and turbine, a second speed responsive electric switch actuated by the second differential gear unit, means for actuating said piston controlled conjointly by the first and second named switches, a third switch actuated by the last named differential gear unit, a solenoid electrically connected with the third switch and a fourth switch actuated by said solenoid and controlled conjointly by the first and third named switches.

2. In a motor vehicle embodying an engine, a torque converter having a turbine therein and a gear train associated therewith, a propeller shaft, and a clutch, mechanism for controlling the operation of said clutch comprising a fluid operated piston connected with said clutch, a differential gear unit driven by the engine and turbine, an electric switch actuated by the differential gear unit, a second differential gear unit driven by the propeller shaft and turbine, a second switch actuated by the second differential gear unit, means for actuating said piston controlled conjointly by the first and second named switches, and means responsive to the speed of the vehicle for holding open the circuit to the first and second named switches until a predetermined speed is attained.

3. In a motor vehicle embodying an engine, a torque converter having a turbine therein, a gear train associated therewith, a propeller shaft, and a clutch for direct drive, mechanism for controlling the operation of said clutch comprising an actuating device for said clutch, a differential speed responsive mechanism driven by the engine and turbine, means in the speed responsive mechanism for effecting the operation of said clutch actuating device to effect direct drive, a second differential speed responsive mechanism driven by the propeller shaft and turbine and means associated with the second speed responsive mechanism to delimit the operation of the first named means to prevent shifting into direct drive below a predetermined excess of speed of the turbine over the propeller shaft.

4. In a motor vehicle embodying an engine, a torque converter including a turbine, a gear train associated therewith, a propeller shaft, and a clutch, mechanism for controlling the operation of said clutch comprising an actuating device for said clutch, a differential speed responsive mechanism driven by the engine and turbine, means in the speed responsive mechanism for the control of said device, an electric switch actuated by said device, a solenoid coupled with the switch, a switch actuated by said solenoid, a second differential speed responsive mechanism driven by the propeller shaft and turbine, means in the second speed responsive mechanism for the control of said device and a second means in the second speed responsive mechanism associated with said solenoid-operated switch to regulate the control means in the first and second speed responsive mechanisms.

5. In combination with a prime mover, a torque converter having a turbine therein and a gear train associated therewith, a propeller shaft, a clutch and a clutch shifting device, mechanism for the control of said shifting device comprising a differential gear unit driven by the prime mover and turbine, a first governor driven by the differential gear unit, a switch actuated by said first governor and electrically connected to said clutch shifting device, a second differential gear unit driven by the propeller shaft and turbine, a second governor driven by the second differential gear unit, a switch actuated by said second governor and electrically connected to said clutch shifting device, a third switch actuated by said clutch shifting device, a fourth switch electrically connected to the third switch to a source of current and to the second governor switch, and means controlled by the second governor to break the circuit through the fourth switch.

6. In combination with an assembly including an engine, a torque converter having a turbine therein, a gear train associated therewith, a propeller shaft and a clutch between the turbine and gear train, mechanism for shifting said clutch comprising a fluid operated piston coupled with said clutch, a valve for the control thereof, a solenoid for actuating said valve, a differential gear unit driven by the engine and turbine, an electric switch actuated by the differential gear unit and connected to said solenoid, a second differential gear unit driven by the propeller shaft and turbine, an electric switch actuated by the second differential gear unit and connected to said solenoid, a second solenoid electrically connected with the switches of the first and second named differential gear units, a switch connected with a source of current and actuated by said second solenoid and a second switch actuated by the second named differential gear unit for breaking the circuit through the second named solenoid at a predetermined speed of the second named differential gear unit.

7. In a motor vehicle embodying an engine, a torque converter including a turbine, a gear train associated therewith, a propeller shaft, a clutch intermediate the gear train and the turbine and a power actuated device for shifting said clutch, mechanism for the automatic control of said device comprising, a differential speed responsive mechanism driven conjointly by the engine and turbine, a pair of electric switches actuated by the speed responsive mechanism, a second differential speed responsive mechanism driven conjointly by the propeller shaft and turbine, a pair of switches actuated by the second speed responsive mechanism, a fifth switch actuated by the clutch shifting device, a solenoid connected with the fifth switch and controlled thereby, electric connection between one of the pair of switches in each of said speed responsive mechanisms and the clutch shifting device, and electric connections between the switch actuated by the clutch shifting device, the solenoid and the other of the pair of switches in the speed responsive devices.

8. In a motor vehicle embodying an engine, a torque converter including a turbine, a gear train associated therewith, a propeller shaft, a clutch intermediate the gear train and the turbine and a power actuated device for shifting said clutch, mechanism for automatic control of said device comprising, a first differential speed responsive mechanism driven conjointly by the engine and turbine, a pair of electric switches actuated by the first mechanism, a second differential speed responsive mechanism driven conjointly by the propeller shaft and turbine, a pair of switches actuated by the second mechanism, electric connection between one of the pair of switches in each said speed responsive mechanisms and the clutch shifting device and a holding circuit for the shifting device, said holding circuit comprising a fifth switch actuated by the clutch shifting device, a solenoid operatively controlled by the fifth switch, a sixth switch connected with a source of current and actuated by said solenoid, and electric connections between the solenoid and one of the switches of the pair of switches in the propeller shaft-turbine speed responsive mechanism.

9. In a motor vehicle embodying an engine, a torque converter including a turbine, a gear train associated therewith, a propeller shaft, a clutch intermediate the gear train and the turbine and a power actuated device for shifting said clutch, mechanism for the automatic control of said device comprising a first governor driven at the speed difference between the engine and turbine, a pair of switches actuated by the first governor, a second governor driven at the speed difference between the propeller shaft and turbine, a pair of switches actuated by the second governor thereby, a third governor driven by said propeller shaft, a switch actuated by the third governor, electric conductors interconnecting one switch of each of said pair of switches, electric connections from one of said interconnected switches to the clutch shifting device arranged to effect the operation thereof upon the simultaneous closure of said switches, a gang switch actuated by said clutch shifting device, electric connections from the gang switch to the second switches of said pairs of switches, and means controlled conjointly by said second switch actuated by the turbine-propeller shaft governor and the switch actuated by the propeller shaft governor for the control of the current through all of said electric connections.

10. In a motor vehicle embodying an engine, a torque converter including a turbine, a gear train associated therewith, a propeller shaft, a clutch intermediate the gear train and the turbine and a power actuated device for shifting said clutch, mechanism for the automatic control of said device comprising a first governor driven at the speed difference between the engine and turbine, a switch actuated by the first governor, a second governor driven at the speed difference between the propeller shaft and turbine, a switch actuated by the second governor, electric connections between said switches and the clutch shifting device arranged to effect the operation thereof upon the simultaneous closure of said switches, a gang switch actuated by said clutch shifting device, a secondary switch actuated by the first governor and electrically connected to said gang switch, a secondary switch actuated by the second governor and electrically connected to said gang switch, and a solenoid operated switch controlled by the last named secondary switch and by the gang switch arranged to hold open the circuit to the clutch shifting device and the circuit through the gang switch subject to the action of the second named governor.

11. In a power unit comprising a prime mover, a torque converter driven thereby, and a change-speed gear box having a high gear, and a low gear and means for shifting gear; an operator actuatable to effect a shift from low to high; means for effecting a shift from high to low when the operator is de-actuated; a first control means operative when the gear box output speed ascends to a predetermined value; a second control means operative when the speed differential of the torque converter declines to a predetermined value, the operator being connected to the control means so as to be actuated only when the two control means are simultaneously operative; and a third control means sensitive to synchronization of the gears in said gear box operative to complete the actuation of the operator.

12. In a power unit comprising a prime mover, a torque converter driven thereby, and a change-speed gear box having a high gear and a low gear, an overrunning clutch in the low gear train, and means for shifting gear; an operator energizable to effect a shift from low to high, and effecting a shift from high to low when de-energized; a first control means operative when the gear box output speed ascends to a predetermined value; a second control means operative when the speed differential of the torque converter declines to a predetermined value, the operator being connected so as to be energized only when the two control means are simultaneously operative; and a third control means sensitive to synchronization of the gears in said gear box operative to complete the energization of the operator.

13. In a power unit comprising a prime mover, a torque converter driven thereby, and a change-speed gear box having a high gear and a low gear, an overrunning clutch in the low gear train, and means for shifting gear; an operator energizable to effect a shift from low to high, and effecting a shift from high to low when de-energized; a first control means operative when the gear box output speed ascends to a predetermined value; a second control means operative when the speed differential of the torque converter declines to a predetermined value, the operator being connected so as to be energized only when the two control means are simultaneously operative; and a third control means responsive to the speed differential of the gear box input and output and operative to complete the energization of the operator when the gears are substantially synchronized.

14. In a power unit comprising a prime mover, a torque converter driven thereby, and a change-speed gear box having a high gear, and a low gear, an overrunning clutch in the low gear train, and means for shifting gear; an operator energizable to effect a shift from low to high, and effecting a shift from high to low when de-energized; a first control means operative when the gear box output speed ascends to a predetermined value; a second control means operative when the speed differential of the torque converter declines to a predetermined value, the operator being connected so as to be energized only when the two control means are simultaneously operative; and a third control means responsive to the speed differential of the gear box input and output, means actuated by the third control means to complete the energization of the operator when the gears are synchronized; a blocking device energized by the second control means when it becomes inoperative, the blocking device being connected to block the return of the second control means to operative condition; and means actuated by the third control means to de-energize the blocking means when the speed differential of the gear box input and output exceeds a predetermined value.

15. In a power unit comprising a prime mover, a torque converter driven thereby, and a change-speed gear box driven by the converter; mechanism for effecting gear changes comprising a control means responsive to the speed differential between the converter input and output; a gear shifting means operable to shift the gear box to a higher or a lower ratio in response to the condition of the control means; a blocking device effective to prevent operation of the shifting means to engage the higher ratio, the blocking device being rendered effective when the control means effects a shift to the lower ratio, and means to maintain the blocking device in its effective condition until the gear box output speed reaches a predetermined value.

16. In a power unit comprising a prime mover, a torque converter driven thereby, and a change-speed gear box driven by the converter; mechanism for effecting gear changes comprising a first control means responsive to the speed differential between the converter input and output; a second control means responsive to the speed differential between the gear box input and output; a gear shifting means operable to shift the gear box to a higher or a lower ratio in response to the condition of the first control means; a blocking device effective to prevent operation of the shifting means to engage the higher ratio, the blocking device being rendered effective when the first control means effects a shift to the lower ratio, and means operated by the second control means to maintain the blocking device in its effective condition until the gear box speed differential reaches a predetermined value.

17. In a power unit comprising a prime mover, a torque converter driven thereby, and a change-speed gear box driven by the converter; mechanism for effecting gear changes comprising a first control means responsive to the speed differential between the converter input and output; a second control means responsive to the speed differential between the gear box input and output; a third control means responsive to the gear box output speed; a gear shifting means operable to shift the gear box to a higher or a lower ratio in response to the condition of the first and third control means; a blocking device effective to prevent operation of the shifting means to engage the higher ratio, the blocking device being rendered effective when the first control means effects a shift to the lower ratio, and means operated by the second control means to maintain the blocking device in its effective condition until the gear box speed differential reaches a predetermined value.

18. In a power unit comprising a prime mover, a torque converter driven thereby, and a change-speed gear box driven by the converter; mechanism for effecting gear changes comprising a first control means responsive to the speed differential between the converter input and output; a second control means responsive to the speed differential between the gear box input and output; a gear shifting means operable to shift the gear box to a higher or a lower ratio in response to the condition of the first control means; a blocking device effective to prevent operation of the shifting means to engage the higher ratio, the blocking device being rendered effective when the first control means effects a shift to the lower ratio, means operated by the second control means to render the blocking device ineffective when the gear box speed differential reaches a predetermined value; a third control means responsive to the gear box output speed, and means operated by the third control device to render the blocking means ineffective when the output speed decreases below a predetermined value.

RENKE BRUNKEN.
RAYMOND HAAG.

REFERENCES CITED

The following references are of record in the file of this patent:

UNITED STATES PATENTS

| Number | Name | Date |
|---|---|---|
| 1,624,008 | Ricker | Apr. 12, 1927 |
| 2,298,649 | Russel | Oct. 13, 1942 |
| 2,332,593 | Nutt et al. | Oct. 26, 1943 |
| 2,373,453 | Brunken | Apr. 10, 1945 |

FOREIGN PATENTS

| Number | Country | Date |
|---|---|---|
| 446,979 | Great Britain | May 8, 1936 |